US012305360B2

(12) United States Patent
Andreuccetti et al.

(10) Patent No.: US 12,305,360 B2
(45) Date of Patent: May 20, 2025

(54) ELECTRIC DRIVETRAIN AND COMPONENT STORAGE CONFIGURATIONS FOR AN ELECTRIC WORK VEHICLE

(71) Applicant: CNH Industrial America LLC, New Holland, PA (US)

(72) Inventors: Christopher Alan Andreuccetti, Burlington, IA (US); Eric James Zieser, Clearwater, KS (US); James Sutor, Galesburg, IL (US); Chad M. Blakewell, Dallas City, IL (US)

( * ) Notice: Subject to any disclaimer, the term of this patent is extended or adjusted under 35 U.S.C. 154(b) by 339 days.

(21) Appl. No.: 17/802,341

(22) PCT Filed: Feb. 26, 2021

(86) PCT No.: PCT/US2021/019845
§ 371 (c)(1),
(2) Date: Aug. 25, 2022

(87) PCT Pub. No.: WO2021/173951
PCT Pub. Date: Sep. 2, 2021

(65) Prior Publication Data
US 2023/0097590 A1    Mar. 30, 2023

Related U.S. Application Data

(60) Provisional application No. 62/982,261, filed on Feb. 27, 2020.

(51) Int. Cl.
*E02F 9/08* (2006.01)
*B60K 1/04* (2019.01)
(Continued)

(52) U.S. Cl.
CPC .............. *E02F 9/0866* (2013.01); *B60K 1/04* (2013.01); *B60L 50/60* (2019.02); *E02F 3/964* (2013.01);
(Continued)

(58) Field of Classification Search
CPC .............. B60K 2001/0411; B60K 1/04; B60L 2200/44; B60L 50/60; B60L 2200/40; E02F 3/964; E02F 9/0883; E02F 9/0866
See application file for complete search history.

(56) References Cited

U.S. PATENT DOCUMENTS 6,437,726 B1 *  8/2002  Price ....................... E02F 9/245
                                                    342/357.62
6,664,751 B1   12/2003  Gabriel et al.
(Continued)

FOREIGN PATENT DOCUMENTS

CN       106274425 A     12/2018
EP        2857601 A1      4/2015
(Continued)

OTHER PUBLICATIONS

CN 106274425 A machine translation from FIT (Year: 2024).*
(Continued)

*Primary Examiner* — Paul N Dickson
*Assistant Examiner* — Maxwell L Meshaka
(74) *Attorney, Agent, or Firm* — Rickard DeMille; Rebecca L. Henkel; Peter K. Zacharias (57) ABSTRACT

In one aspect, an electric work vehicle includes a chassis extending in a longitudinal direction between a first end and an opposed second end, and a cab supported between the first and second ends of the chassis. The work vehicle also includes a work implement assembly positioned at the first end or the second end, and a storage compartment defining a storage volume extending in the longitudinal direction between the cab and the first end or the second end. Moreover, the electric work vehicle includes a battery module positioned within the storage compartment, and a drivetrain including an electric traction motor positioned within the storage compartment and configured to be operated via power supplied from the battery module. The (Continued)

electric traction motor is coupled to a transmission of the drivetrain to allow torque to be transferred from the traction motor to corresponding traction devices of the electric work vehicle.

19 Claims, 3 Drawing Sheets

(51) Int. Cl.
    *B60L 50/60*     (2019.01)
    *E02F 3/96*     (2006.01)

(52) U.S. Cl.
    CPC .... *E02F 9/0883* (2013.01); *B60K 2001/0411* (2013.01); *B60L 2200/40* (2013.01)

(56) References Cited

U.S. PATENT DOCUMENTS

| | | | |
|---|---|---|---|
| 7,282,810 B2 | 10/2007 | Yoshida et al. | |
| 9,169,620 B2* | 10/2015 | Gabibulayev | E02F 9/2095 |
| 9,388,730 B2* | 7/2016 | Tsutsumi | E02F 9/0833 |
| 9,499,042 B2 | 11/2016 | Barth | |
| 10,237,476 B2* | 3/2019 | Ali | H04N 7/181 |
| 10,562,507 B2* | 2/2020 | Jackson | B60T 13/148 |
| 10,683,638 B2* | 6/2020 | Lamela | B60G 17/056 |
| 10,801,179 B2* | 10/2020 | Moen | E02F 9/0883 |
| 10,858,799 B2* | 12/2020 | Jackson | E02F 9/226 |
| 10,882,445 B2* | 1/2021 | McKee | B60Q 9/00 |
| 11,261,582 B1* | 3/2022 | Andreuccetti | F15B 11/165 |
| 11,877,095 B2* | 1/2024 | Zieser | E02F 9/261 |
| 11,933,024 B2* | 3/2024 | Andreuccetti | E02F 9/2221 |
| 11,982,070 B2* | 5/2024 | Andreuccetti | E02F 9/2095 |
| 2002/0063652 A1* | 5/2002 | Price | E02F 9/245 342/22 |
| 2010/0031650 A1 | 2/2010 | Morinaga et al. | |
| 2013/0129460 A1* | 5/2013 | Gabibulayev | E02F 9/2217 414/815 |
| 2015/0068470 A1* | 3/2015 | Tsutsumi | B60K 11/06 123/41.7 |
| 2017/0106792 A1* | 4/2017 | McKee | B60Q 9/00 |
| 2018/0234626 A1* | 8/2018 | Ali | H04N 7/181 |
| 2018/0244252 A1* | 8/2018 | Jackson | B60T 13/686 |
| 2019/0078295 A1* | 3/2019 | Lamela | E02F 9/028 |
| 2019/0186103 A1* | 6/2019 | Moen | E02F 9/2264 |
| 2019/0211528 A1 | 7/2019 | Hita et al. | |
| 2020/0032487 A1* | 1/2020 | Zieser | E02F 9/0858 |
| 2020/0240103 A1* | 7/2020 | Jackson | E02F 9/2207 |
| 2021/0377492 A1* | 12/2021 | Zieser | H04N 7/181 |
| 2022/0134843 A1* | 5/2022 | Andreuccetti | B60H 1/2221 62/239 |
| 2022/0314820 A1* | 10/2022 | Nakada | E02F 9/0883 |
| 2023/0097590 A1* | 3/2023 | Andreuccetti | E02F 9/202 414/722 |
| 2023/0098498 A1* | 3/2023 | Andreuccetti | E02F 9/2246 60/431 |
| 2023/0151584 A1* | 5/2023 | Andreuccetti | F15B 19/00 414/685 |

FOREIGN PATENT DOCUMENTS

| | | | | |
|---|---|---|---|---|
| EP | 2949530 A1 | 12/2015 | | |
| GB | 2547230 A | * | 8/2017 | ........... B28C 5/4237 |
| WO | 2012/059642 A1 | 5/2012 | | |
| WO | 2019/176392 A1 | 9/2019 | | |

OTHER PUBLICATIONS

EP 2949530 A1 machine translation from FIT (Year: 2024).*
International Search Report and Written Opinion for PCT Application No. PCT/US2021/019845 dated Jun. 21, 2021 (14 pages).

* cited by examiner

ELECTRIC DRIVETRAIN AND COMPONENT STORAGE CONFIGURATIONS FOR AN ELECTRIC WORK VEHICLE

FIELD OF THE INVENTION

The present disclosure generally relates to electric work vehicles and, more particularly, to electric drivetrain and component storage configurations for an electric work vehicle, such as an electric backhoe loader or any other electric construction vehicle.

BACKGROUND OF THE INVENTION

Electric work vehicles, such as electric construction vehicles, typically include an electric power source, such as a battery, and various electric power consuming components, such as one or more electric motors. In addition, an electric work vehicle must be equipped various other electric-vehicle-related components, such as a motor/inverter controller and an associated power inverter for converting the DC power available from the battery into usable power for driving the electric motor(s).

When designing an electric work vehicle, careful attention must be paid to the storage location of the battery and any associated electric-vehicle-related components (e.g., the motor/inverter controller and the power inverter), as well as the relative positioning of the vehicle's drivetrain components within the vehicle. In addition, for an electric construction vehicle including a hydraulics-driven work implement, the positioning and/or storage of the hydraulic system components on or within the vehicle must also be carefully considered. Such vehicle design(s) can be particularly challenging when attempting to accommodate the above-described components within the typical design envelope for a conventional engine-driven work vehicle.

Accordingly, a need exists for drivetrain and component storage configurations for an electric work vehicle that allow for various vehicle components to be accommodated within the work vehicle in an effective and efficient manner.

SUMMARY OF THE INVENTION

Aspects and advantages of the technology will be set forth in part in the following description, or may be obvious from the description, or may be learned through practice of the technology.

In one aspect, the present subject matter is directed to an electric work vehicle including a chassis extending in a longitudinal direction between a first end of the chassis and an opposed second end of the chassis, and a cab supported between the first and second ends of the chassis. The work vehicle also includes a work implement assembly positioned at one of the first end or the second end of the chassis, and a storage compartment defining a storage volume extending in the longitudinal direction between the cab and one of the first end or the second end of the chassis. Moreover, the electric work vehicle includes a battery module positioned within the storage compartment, and a drivetrain including an electric traction motor positioned within the storage compartment and configured to be operated via power supplied from the battery module. The electric traction motor is coupled to a transmission of the drivetrain to allow torque to be transferred from the electric traction motor to corresponding traction devices of the electric work vehicle.

In another aspect, the present subject matter is directed to an electric work vehicle including a chassis extending in a longitudinal direction between a first end of the chassis and an opposed second end of the chassis, and a cab supported between the first and second ends of the chassis. The electric work vehicle also includes a work implement assembly positioned at one of the first end or the second end of the chassis, and a storage compartment defining a storage volume extending in the longitudinal direction between the cab and one of the first end or the second end of the chassis. Moreover, the electric work vehicle includes a battery module supported relative to the chassis, and a drivetrain including an electric traction motor positioned within the storage compartment and configured to be operated via power supplied from the battery module. The electric traction motor is coupled to a transmission of the drivetrain to allow torque to be transferred from the electric traction motor to corresponding traction devices of the electric work vehicle. Additionally, an output shaft of the electric traction motor is coaxially aligned with an input shaft of the transmission.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to electric drivetrain and component storage configurations for an electric work vehicle. Specifically, in several embodiments, the work vehicle may include one or more storage compartments for storing various electric-related-vehicle components of the work vehicle, such as a primary storage compartment positioned in front of the vehicle's cab and one or more side storage compartments. In one embodiment, the front storage compartment may include the same or a similar design envelope as the engine compartment of a conventional engine-driven vehicle of the same vehicle type. For instance, as will be described below, utilizing the same design envelope as a typical engine compartment, the front storage compartment may be configured to accommodate, among other components, a power storage device of the work vehicle, such as a battery module, and one or more components of the vehicle's drivetrain, such as an electric traction motor, a torque converter, and a transmission of the drivetrain. As a result, the disclosed storage configuration may allow a conventional engine-driven work vehicle to be converted to an electric work vehicle with little or no design changes to the existing vehicle chassis/body.

Additionally, in one embodiment, the electric traction motor may be configured to be positioned within the front storage compartment so as to be axially aligned with the transmission. For instance, as will be described below, an output shaft of the electric traction motor may be coaxially aligned with the input shaft of the transmission such that a common drive axis is defined along the vehicle's drivetrain. Such an ability to position the electric traction motor in-line with the drive axis of the input shaft of the transmission provides further advantages when converting a conventional engine-driven work vehicle to an electric work vehicle.

Figure 1:
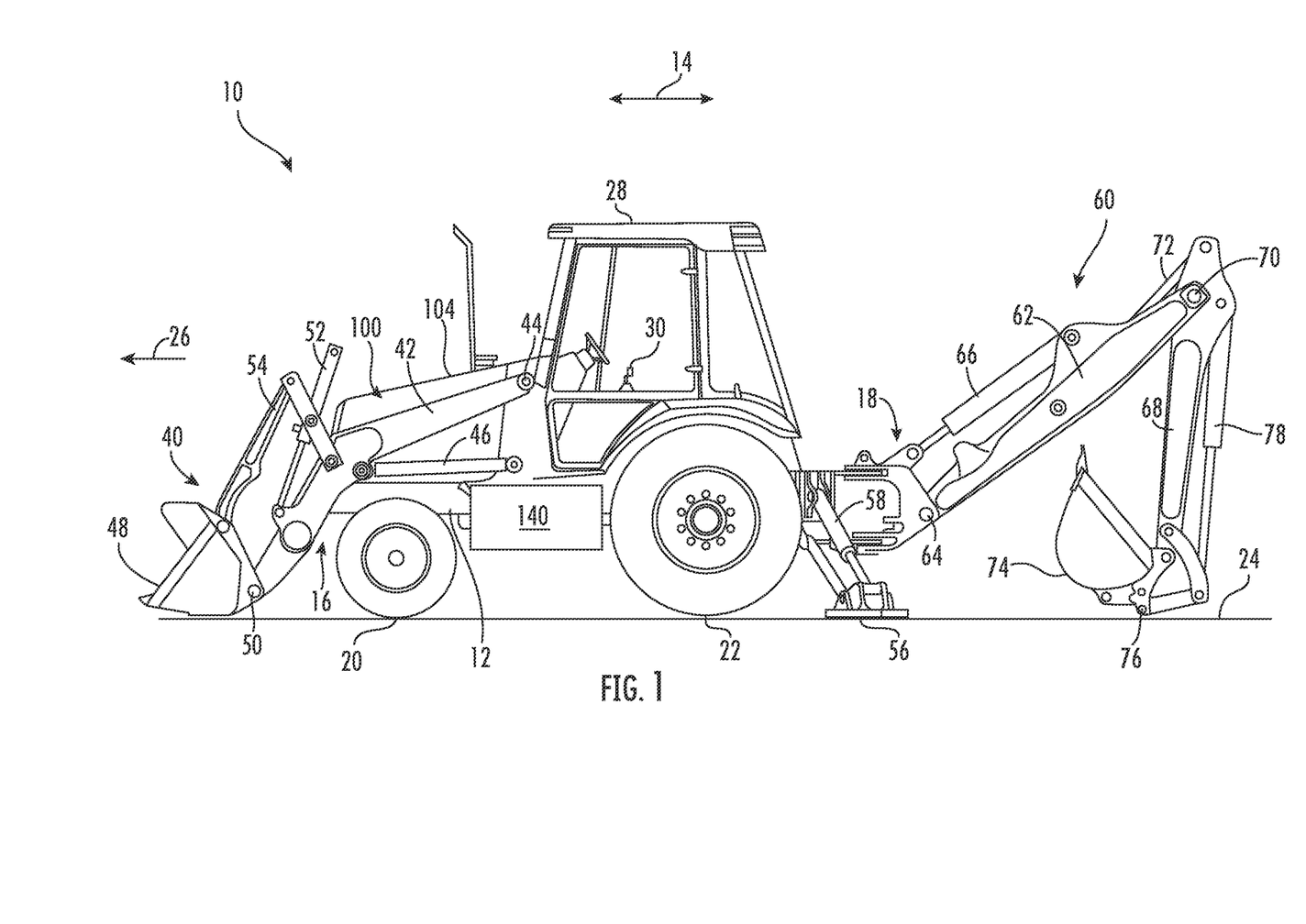
FIG. 1 illustrates a side view of one embodiment of an electric work vehicle in accordance with aspects of the present subject matter.

Referring now to the drawings, FIG. 1 illustrates a side view of one embodiment of an electric work vehicle in accordance with aspects of the present subject matter. As shown, the electric work vehicle is configured as an electric backhoe loader 10 (also often referred to as a "tractor-loader-backhoe" (TLB) or a "loader backhoe). However, in other embodiments, aspects of the present subject matter may also be utilized within other electric work vehicles, such as various other construction vehicles. For instance, in one embodiment, aspects of the present subject matter may be advantageously utilized with other electric construction vehicles including at least one hydraulically driven work implement assembly, such as a wheel loader, a skid-steer loader, and/or a bulldozer.

As shown in FIG. 1, the backhoe loader 10 includes a frame or chassis 12 extending in a longitudinal direction (indicated by arrow 14 in FIG. 1) of the vehicle between a forward end 16 of the chassis 12 and an aft end 18 of the chassis 12. In general, the chassis 12 may be configured to support or couple to a plurality of components. For example, a pair of steerable front traction devices (e.g., front wheels 20 (one of which is shown)) and a pair of driven rear traction devices (e.g., rear wheels 22 (one of which is shown)) may be coupled to the chassis 12. The wheels 20, 22 may be configured to support the backhoe loader 10 relative to a ground surface 24 and move the loader 10 along the ground surface 24 in a direction of travel, such as a forward direction of travel (e.g., as indicated by arrow 26 in FIG. 1). However, in alternative embodiments, the front wheels 20 may be driven in addition to or in lieu of the rear wheels 22. Additionally, an operator's cab 28 may be supported by a portion of the chassis 12 positioned between the forward and aft ends 16, 18 of the chassis 12, and may house one or more operator control devices 30 (e.g., a joystick(s), a lever(s), and/or the like) for permitting an operator to control the operation of the backhoe loader 10.

The backhoe loader 10 also includes a pair of hydraulically driven work implement assemblies positioned at the opposed ends 16, 18 of the chassis 12. Specifically, in the illustrated embodiment, the backhoe loader 10 includes a loader assembly 40 supported by or relative the chassis 12 at or adjacent to its forward end 16. As shown in FIG. 1, the loader assembly 40 includes a loader arm 42 pivotably coupled or supported relative to the chassis 12 at a loader arm pivot point 44, and a loader lift cylinder 46 secured between the loader arm 42 and the chassis 12. In such an embodiment, extension/retraction of the loader lift cylinder 46 may result in the loader arm 42 pivoting upwards/downwards about its respective pivot point 44, thereby allowing the positioning of the loader arm 42 relative to both the chassis 12 and the ground surface 24 to be adjusted, as desired. Moreover, as shown in FIG. 1, the loader assembly 40 further includes a first work implement 48, such as a loader bucket, coupled to the loader arm 42 at an implement pivot point 50, and a first implement tilt cylinder 52 secured between the work implement 48 (e.g., via a linkage(s) 54) and a portion of the loader arm 44. As such, extension/retraction of the first implement tilt cylinder 52 may result in the first work implement 48 pivoting upwards/downwards relative to the loader arm 42 about its respective pivot point 50, thereby permitting the tilt angle or orientation of the implement 48 to be adjusted, as desired. Thus, by controlling the operation of the lift and tilt cylinders 46, 52 of the loader assembly 40, the vertical positioning and orientation of the first work implement 48 may be adjusted to allow for the execution of one or more operations, such as one or more material-moving operations.

Additionally, the backhoe loader 10 includes a backhoe assembly 60 supported by or relative the chassis 12 at or adjacent to its aft end 18. As shown in FIG. 1, the backhoe assembly 60 includes a boom 62 pivotably coupled or supported relative to the chassis 12 at a boom pivot point 64, and a boom lift cylinder 66 secured between the boom 62 and the chassis 12. In such an embodiment, extension/retraction of the boom cylinder 66 may result in the boom 62 pivoting upwards/downwards about its respective pivot point 64, thereby allowing the positioning of the boom 62 relative to both the chassis 12 and the ground surface 24 to be adjusted, as desired. The backhoe assembly 60 also includes a dipper arm 68 coupled to the boom 62 at a dipper pivot point 70, and a dipper cylinder 72 secured between the dipper arm 68 and the boom 62. In such an embodiment, extension/retraction of the dipper cylinder 72 may result in the dipper arm 68 pivoting upwards/downwards about its respective pivot point 70 relative to the boom 62. Moreover, as shown in FIG. 1, the backhoe assembly 60 further includes a second work implement 74, such as a dipper bucket, coupled to the dipper arm 68 at an implement pivot point 76, and a second implement tilt cylinder 78 secured between the work implement 74 and a portion of the dipper arm 68. As such, extension/retraction of the second implement tilt cylinder 78 may result in the second work implement 74 pivoting upwards/downwards relative to the dipper arm 68 about its respective pivot point 76, thereby permitting the tilt angle or orientation of the implement 74 to be adjusted, as desired. Thus, by controlling the operation of the various cylinders 66, 72, 78 of the backhoe assembly 60, the vertical positioning and orientation of the second work implement 74 may be adjusted to allow for the execution of one or more operations, such as one or more material excavation operations.

As shown in FIG. 1, the backhoe loader 10 may also include a pair of stabilizer legs 56 (one of which is shown) positioned at or adjacent to the aft end 18 of the chassis 12. The stabilizer legs 56 may be configured to support the weight of the backhoe loader 10 and/or otherwise stabilize the vehicle during the performance of a backhoe-related operation. For instance, the stabilizer legs 56 may be pivotably coupled to the chassis 12 to allow the legs 56 to be moved or pivoted (e.g., via the operation of an associated stabilizer leg cylinder 58) between a lowered position, at which the legs 56 contact the ground surface 24, and a raised position, at which the legs 56 are lifted off the ground surface 24 to allow the backhoe loader 10 to be moved (e.g., in the forward direction of travel 26). It should be appreciated that, in addition to lowering the stabilizer legs 56, the loader assembly 40 may also be lowered during the performance of a backhoe-related operation such that the first work implement 48 contacts the ground, thereby providing a point-of-contact to stabilize the front end 16 of the chassis 12.

In accordance with aspects of the present subject matter, the backhoe loader 10 may also include a forward storage compartment 100 positioned in front or forward of the operator's cab 26 relative to the forward direction of travel 26 such that the forward storage compartment 100 defines a storage volume 102 (FIG. 2) extending the longitudinal direction 14 between the cab 26 and the forward end 16 of the chassis 12. In one embodiment, the forward storage compartment 100 may be defined by one or more walls of the vehicle's body, such as, for example, a hood 104 configured to extend over and cover the storage volume 102 of the forward storage compartment 100.

Figure 2:
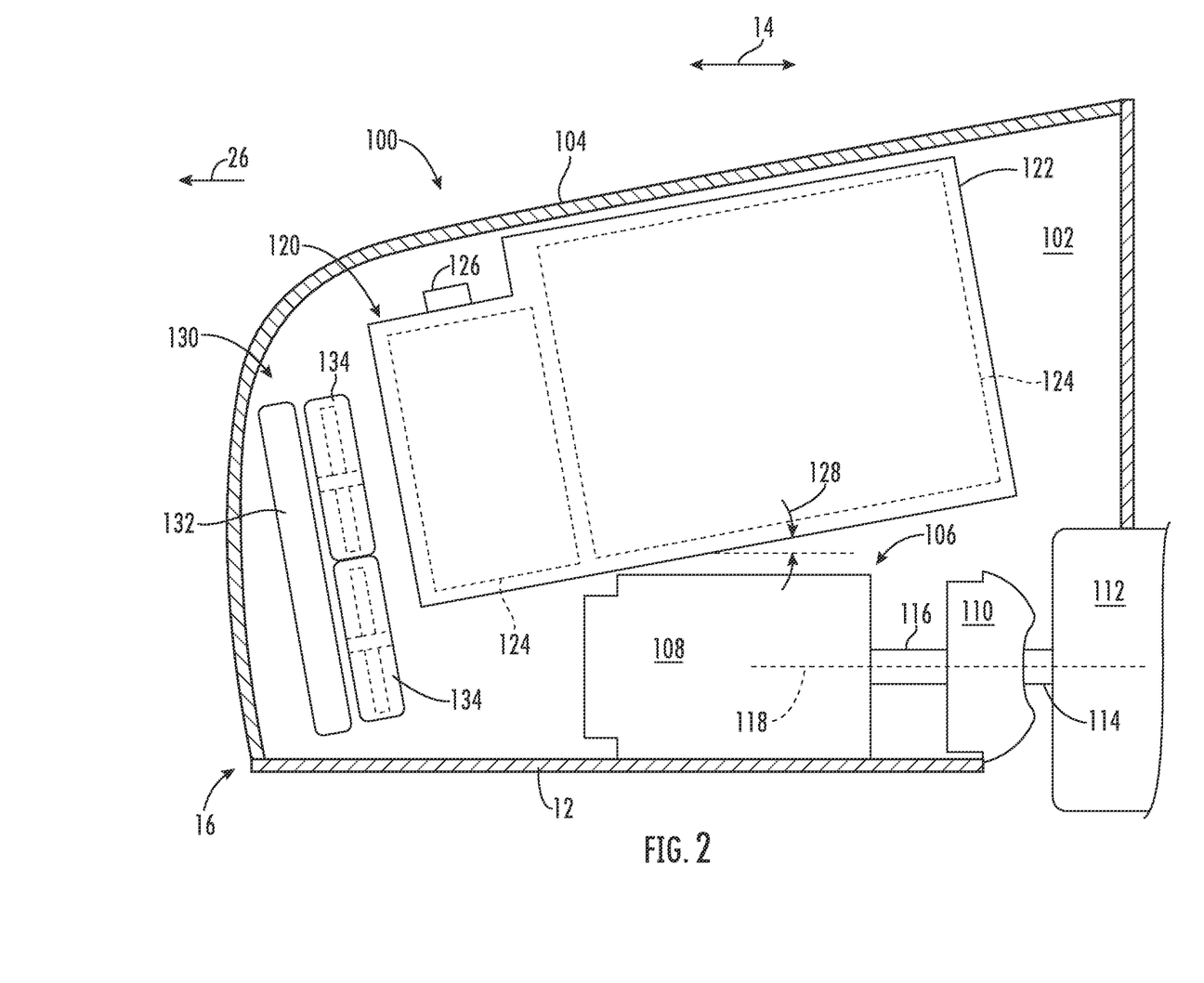
FIG. 2 illustrates a simplified, cross-sectional view of one embodiment of a forward storage compartment of the electric work vehicle shown in FIG. 1 in accordance with aspects of the present subject matter, particularly illustrating a battery module and an electric traction motor, among other things, positioned within the forward storage compartment.

In general, the storage volume 102 defined by the forward storage compartment 100 may configured to provide or function as storage space for various under-hood components of the backhoe loader 10, such as one or more power storage and/or control components, one or more drivetrain components, and/or one or more cooling assembly components. For instance, as will be described below, in several embodiments, a battery module, an electric traction motor, and electric cooling fans, among other things, may be housed within the forward storage compartment 100.

It should be appreciated that, in several embodiments, the location, size, and/or configuration of the forward storage compartment 100 of the electric backhoe loader 10 may be the same as or similar to the design envelope of an engine compartment of a conventional backhoe loader (e.g., a traditional engine-driven backhoe loader). In such embodiments, one or more of the concepts disclosed herein, including the under-hood storage of various power-related and drivetrain components within the forward storage compartment 100, may be utilized to convert a conventional engine-driven backhoe loader to an electric backhoe loader. For instance, by removing the engine and related components from the engine compartment, the open storage volume defined by the engine compartment may be used in the same manner as the forward storage compartment 100 described herein (e.g., to house various electric-vehicle-related components of the backhoe loader 10).

Moreover, as shown in FIG. 1, the backhoe loader 10 may also include enclosed side storage compartments positioned along both sides of the vehicle, such as a first side storage compartment 140 positioned along a first side of the chassis 12 and a second side storage compartment 142 (not shown in FIG. 1—see FIG. 4) positioned along an opposed second side of the chassis 12. As will be described below with reference to FIGS. 3 and 4, the side storage compartments 140, 142 may, in several embodiments, be utilized for storing various components of the vehicle's hydraulic system, such as an electric hydraulics-driving motor and an associated pump of the hydraulic system, and or various components of the vehicles power control system, such as a motor/inverter controller(s) and an associated power inverter(s).

As indicated above, it should be appreciated that, in other embodiments, the present subject matter may be advantageously applied within various other electric work vehicles, such as various other electric construction vehicles. For instance, in addition to a backhoe loader, aspects of the present subject matter may also be applied within electric construction vehicles only including a single work implement assembly positioned at one end of the vehicle's chassis, such as a wheel loader, skid-steer loader, bulldozer, and/or the like.

Referring now to FIG. 2, a simplified, cross-sectional view of one embodiment of the forward storage compartment 100 of the electric backhoe loader 100 described above with reference to FIG. 1 is illustrated in accordance with aspects of the present subject matter, particularly illustrating various components of the work vehicle housed within the storage volume 102 defined by the forward storage compartment 100. As shown, one or more components of the vehicle's electric drivetrain 106 may be housed or at least partially housed within the forward storage compartment 100, such as an electric traction motor 108, a torque converter 110, and a transmission 112 (only a portion of which is shown) of the drivetrain 106. Specifically, in the illustrated embodiment, the electric traction motor 108 is positioned within the forward storage compartment 100 at a location that allows it to be rotationally coupled to the vehicle's torque converter 110, thereby allowing torque from the motor 108 to be transmitted through the torque converter 110 to an input shaft 114 of the transmission 112. As is generally understood, the transmission 112 may be coupled to the driven traction devices of the backhoe loader 10 (e.g., rear wheels 18) via a drive axle assembly for rotationally driving such traction devices. As particularly shown in FIG. 2, the electric traction motor 108 is positioned within the forward storage compartment 100 such that an output shaft 116 of the motor 108 is coaxially aligned with the input shaft 114 of the transmission 112. As such, a common drive axis 118 is defined along the electric drivetrain 106 about which the output shaft 116 of the motor 108, the rotating components of the torque converter 110 (e.g., the impeller and the turbine), and the input shaft 114 of the transmission 112 rotate as the drivetrain 106 is being used to transfer torque to the vehicle's traction devices.

It should be appreciated that the common drive axis 118 allows the electric traction motor 108 to be installed in-line with the torque converter 110 and transmission 112 without requiring any intermediate components, such as gearboxes and/or the like. As a result, the disclosed electric drivetrain configuration may provide advantages when converting a conventional engine-driven vehicle to an electric vehicle, as the existing torque converter and transmission may, in certain instances, be used without any modifications or with only minimal modifications.

Additionally, as shown in FIG. 2, the front storage compartment 100 may also be configured to house one or more power-related components of the electric work vehicle 10. Specifically, in the illustrated embodiment, a power storage device, such as a battery module 120, may be positioned within the front storage compartment 100, such as at a location above the electric traction motor 108. As is generally understood, the battery module 120 may be configured to store electrical power for use in powering the various power-consuming components of the vehicle 10, such as the electric traction motor 108 and/or the like. As shown in FIG. 2, the battery module 120 may include, for example, an outer battery housing 122 and one or more batteries 124 positioned within the battery housing 122. Additionally, a battery disconnect switch 126 or other device may be provided at an accessible location along the exterior of the battery module 120, such as at the top of the battery housing 122, to allow the batteries 124 to be quickly and effectively disconnected from the various power consuming components of the electric work vehicle 10.

It should be appreciated that, in several embodiments, the orientation of the battery module 120 within the storage compartment 100 may be selected, as desired or as is necessary, based on, for example, the available storage volume 102 within the front storage compartment 100, as well as the overall dimensions of the battery module 120. For instance, in the illustrated embodiment, the battery module 120 is shown as being mounted within the forward storage compartment 100 (e.g., via corresponding mounting brackets/hardware, support beams, and/or the like (not shown)) at an angle 128 relative to a horizontal reference plane to allow the battery size (and, thus, the battery capacity) to be maximized.

In addition to the battery module 120, one or more other power-related components of the electric work vehicle may also be stored within the forward storage compartment 100, depending on the storage requirements of such components. For instance, although not shown, one or more power inverters may be housed within the forward storage compartment 100 and may be coupled to the battery module 120 via a direct current (DC) voltage bus or any other suitable electrical coupling for converting the direct current supplied by the batteries 124 of the battery module 120 to an alternating current for powering the vehicle's electric motors (e.g., the electric traction motor 108 and the electric hydraulics-driving motor (not shown in FIG. 2)). An associated motor/inverter controller(s) (not shown) may also be positioned within the forward storage compartment for controlling the operation of the power inverter(s) in a manner that drives each electric motor as desired, such as by ensuring that each motor is driven so as to achieve a desired speed and/or torque output. However, as will be described below, the power inventor(s) and/or the associated motor/inverter controller(s) may, in alternative embodiments, be stored within one of the side storage compartments 140, 142 of the electric work vehicle 10.

Referring still to FIG. 2, one or more components of the vehicle's cooling assembly 130 may also be housed within the forward storage compartment 100. For instance, as shown in the illustrated embodiment, one or more heat exchangers 132 may be positioned at the front end of the forward storage compartment 102 (e.g., at a location between a front portion of the hood 104 forming the front wall of the forward storage compartment 100 and the battery module 120) for removing heat from one or more cooling fluids (e.g., oil, water, and/or the like) supplied through associated cooling circuits of the vehicle for cooling the vehicle's various heat-generating components, such as the batteries, the electric motors, power inverters, and/or the like. Additionally, as shown in FIG. 2, one or more electric cooling fans 134 (e.g., an array of cooling fans, such as a 2×2 array or a 4×4 array) may be positioned adjacent to the heat exchanger(s) 132 for generating an airflow through the heat exchanger(s) 132. The airflow generated by the electric cooling fans 134 may also, in one embodiment, be directed around the exterior of the battery module 120 to provide a cooling airflow thereto. In one embodiment, the electric cooling fans 134 may correspond to DC-powered cooling fans to allow the battery module 129 to serve as a direct power source for the fans 134.

Figure 3:
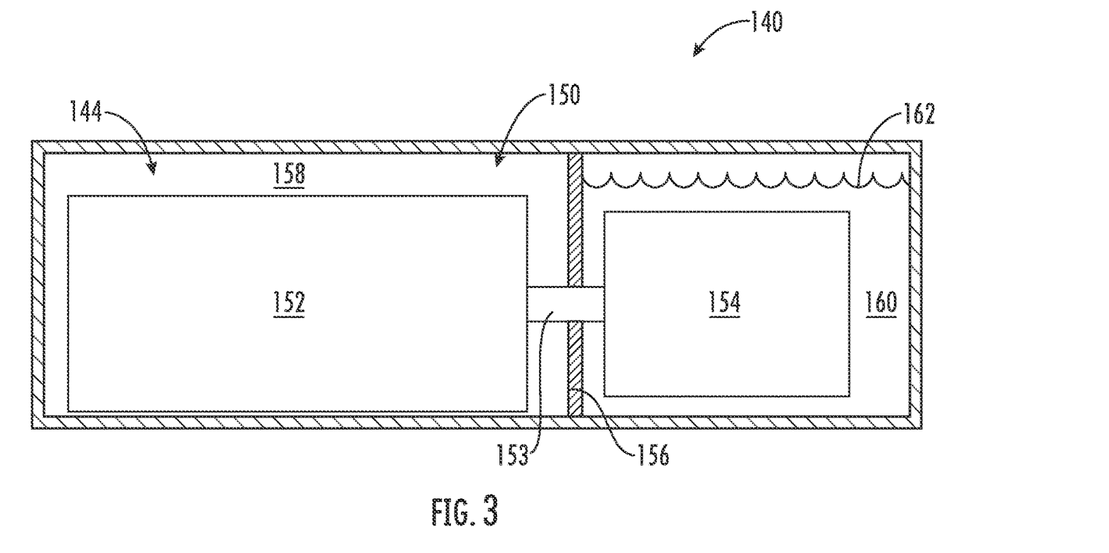
FIG. 3 illustrates a simplified, cross-sectional view of one embodiment of a side storage compartment of the electric work vehicle shown in FIG. 1 in accordance with aspects of the present subject matter, particularly illustrating components of the vehicle's hydraulic system positioned within the side storage compartment.
Figure 4:
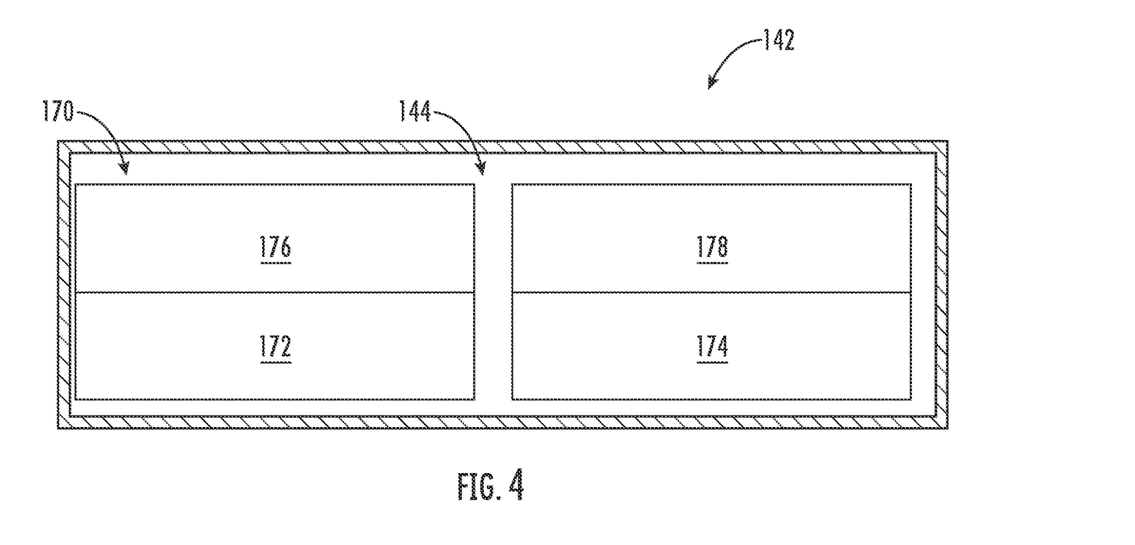
FIG. 4 illustrates a simplified, cross-sectional view of another embodiment of a side storage compartment of the electric work vehicle shown in FIG. 1 in accordance with aspects of the present subject matter, particularly illustrating components of the vehicle's power control system positioned within the side storage compartment.

Referring now to FIGS. 3 and 4, simplified, cross-sectional views of embodiments of the first side storage compartment 140 (FIG. 3) and the second side storage compartment 142 (FIG. 4) of the electric backhoe loader 10 described above with reference to FIG. 1 is illustrated in accordance with aspects of the present subject matter. Specifically, FIGS. 3 and 4 illustrate examples of suitable componentry that may be stored within an enclosed storage volume 144 defined by each of the vehicle's side storage compartments 140, 142. However, it should be appreciated that, in other embodiments, various other vehicle components may additionally (or alternatively) be stored within the vehicle's side storage compartments 140, 142.

As shown in FIG. 3, various components of the vehicle's hydraulic system 150 may be stored within one of the vehicle's side storage compartments (e.g., the first side storage compartment 140). Specifically, in the illustrated embodiment, an electric hydraulics-driving motor 152 and an associated pump 154 of the hydraulic system 150 are housed within the first side storage compartment 140. In such an embodiment, the electric hydraulics-driving motor 152 may be powered via the battery module 120 (FIG. 2) (and controlled via a motor/inverter controller and associated power inverter) to rotationally drive the hydraulic pump 154 (e.g., via an output shaft 153 of the motor 152), thereby providing a source of pressurized hydraulic fluid for delivery to the various actuators or cylinders of the backhoe loader 10.

It should be appreciated that, in one embodiment, the first side storage compartment 140 may be correspond to a fully enclosed compartment. Additionally, as shown in FIG. 3, in one embodiment, an interior divider wall 156 may be provided within the first side storage compartment 140 to separate the storage volume 144 defined by the compartment 140 into two isolated storage chambers, such as a first storage chamber 158 within which the electric hydraulics-driving motor 152 is housed and a second storage chamber 160 within which the hydraulic pump 154 is stored (with the output shaft 153 of the motor 152 extending through the divider wall 156). In such an embodiment, in addition to housing the pump 154, the second storage chamber 160 may also function as the vehicle's hydraulic tank for storing hydraulic fluid 162. Such a configuration (i.e., positioning the pump 154 within the hydraulic tank) may reduce the amount of noise generated by the pump 154 (e.g., as perceived by the operator).

In alternative embodiments, the vehicle's hydraulic tank may be separate from the first side storage compartment 140 and/or formed as a storage chamber separate from the storage chamber in which the hydraulic pump 154 is stored. For instance, in one embodiment, the electric hydraulics-driving motor 152 and the hydraulic pump 154 may be stored within a first storage chamber of the first side storage compartment 140 and the hydraulic fluid 162 may be stored in a second storage chamber of the first side storage compartment 140, with the pump 154 being fluidly coupled to the second storage chamber (e.g., via a suitable conduit). Alternatively, the vehicle's hydraulic tank may be completely separate and spaced apart from the first side storage compartment 140.

It should also be appreciated that, when mounting the electric hydraulics-driving motor 152 and the hydraulic pump 154 within the first side storage compartment 140, vibration dampers or other suitable vibration-reducing hardware may be used to reduce the amount of vibrational noise generated by such components. For instance, in one embodiment, isolation mounts (and, optionally, an associated mounting bracket) may be used to mount the electric hydraulics-driving motor 152 and/or the hydraulic pump 154 within the first side storage compartment 140.

Additionally, as shown in FIG. 4, various components of the vehicle's power control system 170 may be stored within one of the vehicle's side storage compartments (e.g., the second side storage compartment 142). Specifically, in the illustrated embodiment, one or more motor/inverter controller(s) (e.g., a traction motor/inverter controller 172 and a hydraulics-driving motor inverter/inverter controller 174) and one or more associated power inverters of the power control system 170 (e.g., a traction motor inverter 176 and a hydraulics-driving motor inverter 178) may be housed within the second side storage compartment 142. As indicated above, each motor/inverter controller 172, 174 may be configured to control the operation of the respective inverter 176, 178 to regulate the power suppled to the associated electric motor 108, 152, thereby allowing the controllers 172, 174 to control the output of the electric motors. For instance, the traction motor/inverter controller 172 may be configured to control the operation of the traction motor inverter 176 to regulate the speed/torque output of the electric traction motor 108. Similarly, the hydraulics-driving motor inverter/inverter controller 174 may be configured to control the operation of the hydraulics-driving motor inverter 178 to regulate the speed output of the hydraulics-driving motor 152.

Although not shown, it should be appreciated that one or both of the side storage compartments 140, 142 may include suitable ports and/or openings to allow a portion of a cooling circuit to be plumbed therethrough for cooling the components housed therein. For instance, in one embodiment, the motor/inverter controllers 172, 174 and associated power inverters 176, 178 may be configured to be water-cooled. In such an embodiment, a cooling circuit may be plumbed from the corresponding heat exchanger 132 and into the second side storage compartment 142 to provide cooling for such power control components.

It should be appreciated that, in one embodiment, each motor/inverter controller 172, 174 may correspond to one or more processor-based devices, such as one or more computing devices. Thus, each motor/inverter controller 172, 174 may include, for example, one or more processor(s) and associated memory devices configured to perform a variety of computer-implemented functions (e.g., performing one or more methods, steps, algorithms, calculations and/or the like). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor(s), including data that can be retrieved, manipulated, created and/or stored by the processor(s) and instructions that can be executed by the processor(s). For instance, the memory may store computer-readable instructions that, when executed by the processor(s), configure each motor/inverter controller 172, 174 to control the operation of its respective power inverter 176, 178 and, thus, the associated electric motor.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An electric work vehicle, comprising:
   a chassis extending in a longitudinal direction between a first end of the chassis and an opposed second end of the chassis;
   a cab supported between the first and second ends of the chassis;
   a work implement assembly positioned at one of the first end or the second end of the chassis;
   a storage compartment defining a storage volume extending in the longitudinal direction between the cab and one of the first end or the second end of the chassis;
   a battery module positioned within the storage compartment;
   a drivetrain including an electric traction motor positioned within the storage compartment and configured to be operated via power supplied from the battery module, the electric traction motor coupled to a transmission of the drivetrain to allow torque to be transferred from the electric traction motor to corresponding traction devices of the electric work vehicle; and
   a side storage compartment positioned along one side of the chassis, the side storage compartment housing an electric hydraulics-driving motor and a hydraulic pump, the electric hydraulics-driving motor being operated via power supplied from the battery module and configured to rotationally drive the hydraulic pump to provide a source of pressurized hydraulic fluid to an actuator associated with the work implement assembly.

2. The electric work vehicle of claim 1, wherein an output shaft of the electric traction motor is coaxially aligned with an input shaft of the transmission.

3. The electric work vehicle of claim 1, wherein the electric traction motor is coupled to the transmission via a torque converter positioned within the storage compartment.

4. The electric work vehicle of claim 1, wherein the side storage compartment includes an interior divider wall that divides an interior storage volume defined by the side storage compartment into a first storage chamber and a second storage chamber, the electric hydraulics-driving motor being positioned within the first storage chamber and the hydraulic pump being positioned within the second storage chamber.

5. The electric work vehicle of claim 4, wherein the second storage chamber is configured as a hydraulic tank for storing hydraulic fluid.

6. The electric work vehicle of claim 1, further comprising a side storage compartment positioned along one side of the chassis, the side storage compartment housing a motor/inverter controller and a power inverter, the motor/inverter controller being configured to control the operation of the power inverter for regulating a supply of power from the battery module to the electric traction motor.

7. The electric work vehicle of claim 1, wherein the first end of the chassis comprises a forward end of the chassis and the second end of the chassis comprises an aft end of the chassis, the work implement assembly comprising a loader assembly positioned at the forward end of the chassis, the loader assembly including a loader arm supported relative to the chassis and a first work implement pivotably coupled to the loader arm.

8. The electric work vehicle of claim 7, further comprising a backhoe assembly positioned at the aft end of the chassis, the backhoe assembly including at least one arm supported relative to the chassis and a second work implement pivotably coupled to the at least one arm.

9. The electric work vehicle of claim 8, wherein the storage compartment comprises a forward storage compartment extending in the longitudinal direction between the cab and the forward end of the chassis.

10. An electric work vehicle, comprising:
a chassis extending in a longitudinal direction between a first end of the chassis and an opposed second end of the chassis;
a cab supported between the first and second ends of the chassis;
a work implement assembly positioned at one of the first end or the second end of the chassis;
a storage compartment defining a storage volume extending in the longitudinal direction between the cab and one of the first end or the second end of the chassis;
a battery module supported relative to the chassis;
a drivetrain including an electric traction motor positioned within the storage compartment and configured to be operated via power supplied from the battery module, the electric traction motor coupled to a transmission of the drivetrain to allow torque to be transferred from the electric traction motor to corresponding traction devices of the electric work vehicle; and
a side storage compartment positioned along one side of the chassis, the side storage compartment housing an electric hydraulics-driving motor and a hydraulic pump, the electric hydraulics-driving motor being operated via power supplied from the battery module and configured to rotationally drive the hydraulic pump to provide a source of pressurized hydraulic fluid to an actuator associated with the work implement assembly;
wherein an output shaft of the electric traction motor is coaxially aligned with an input shaft of the transmission.

11. The electric work vehicle of claim 10, wherein the battery module is positioned within the storage compartment.

12. The electric work vehicle of claim 10, wherein the electric traction motor is coupled to the transmission via a torque converter positioned within the storage compartment.

13. The electric work vehicle of claim 10, wherein the side storage compartment includes an interior divider wall that divides an interior storage volume defined by the side storage compartment into a first storage chamber and a second storage chamber, the electric hydraulics-driving motor being positioned within the first storage chamber and the hydraulic pump being positioned within the second storage chamber.

14. The electric work vehicle of claim 13, wherein the second storage chamber is configured as a hydraulic tank for storing hydraulic fluid.

15. The electric work vehicle of claim 10, further comprising a side storage compartment positioned along one side of the chassis, the side storage compartment housing a motor/inverter controller and a power inverter, the motor/inverter controller being configured to control the operation of the power inverter for regulating a supply of power from the battery module to the electric traction motor.

16. The electric work vehicle of claim 10, wherein the first end of the chassis comprises a forward end of the chassis and the second end of the chassis comprises an aft end of the chassis, the work implement assembly comprising a loader assembly positioned at the forward end of the chassis, the loader assembly including a loader arm supported relative to the chassis and a first work implement pivotably coupled to the loader arm.

17. The electric work vehicle of claim 16, further comprising a backhoe assembly positioned at the aft end of the chassis, the backhoe assembly including at least one arm supported relative to the chassis and a second work implement pivotably coupled to the at least one arm.

18. The electric work vehicle of claim 17, wherein the storage compartment comprises a forward storage compartment extending in the longitudinal direction between the cab and the forward end of the chassis.

19. An electric work vehicle, comprising:
a chassis extending in a longitudinal direction between a first end of the chassis and an opposed second end of the chassis;
a cab supported between the first and second ends of the chassis;
a work implement assembly positioned at one of the first end or the second end of the chassis;
a storage compartment defining a storage volume extending in the longitudinal direction between the cab and one of the first end or the second end of the chassis;
a battery module positioned within the storage compartment;
a drivetrain including an electric traction motor positioned within the storage compartment and configured to be operated via power supplied from the battery module, the electric traction motor coupled to a transmission of the drivetrain to allow torque to be transferred from the electric traction motor to corresponding traction devices of the electric work vehicle; and
a side storage compartment positioned along one side of the chassis, the side storage compartment housing a motor/inverter controller and a power inverter, the motor/inverter controller being configured to control the operation of the power inverter for regulating a supply of power from the battery module to the electric traction motor.

* * * * *